United States Patent
Gupta et al.

(10) Patent No.: US 11,093,497 B1
(45) Date of Patent: Aug. 17, 2021

(54) NEAREST NEIGHBOR SEARCH AS A SERVICE

(71) Applicant: Amazon Technologies, Inc., Seattle, WA (US)

(72) Inventors: Pracheer Gupta, Stanford, CA (US); Poorna Chand Srinivas Perumalla, Seattle, WA (US); Stefano Stefani, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 327 days.

(21) Appl. No.: 15/934,240

(22) Filed: Mar. 23, 2018

(51) Int. Cl.
| G06F 16/24 | (2019.01) |
| G06F 16/2453 | (2019.01) |
| G06F 16/22 | (2019.01) |
| G06F 16/23 | (2019.01) |
| G06F 16/901 | (2019.01) |

(52) U.S. Cl.
CPC .... *G06F 16/24542* (2019.01); *G06F 16/2237* (2019.01); *G06F 16/2282* (2019.01); *G06F 16/2343* (2019.01); *G06F 16/2379* (2019.01); *G06F 16/9024* (2019.01)

(58) Field of Classification Search
CPC .............. G06F 16/2237; G06F 16/316; G06F 16/2358; G06F 16/9024; G06F 16/245; G06F 16/24553; G06F 16/9027; G06F 16/903

See application file for complete search history.

(56) References Cited

U.S. PATENT DOCUMENTS

| 6,480,849 B1* | 11/2002 | Lee | G06F 16/2343 |
| 6,732,084 B1 | 5/2004 | Kabra et al. | |
| 7,877,483 B1 | 1/2011 | Finn | |
| 8,584,241 B1 | 11/2013 | Jenks et al. | |
| 8,903,824 B2* | 12/2014 | Akoglu | G06F 16/2246 707/737 |
| 2002/0138353 A1* | 9/2002 | Schreiber | G06F 16/9024 705/26.1 |
| 2003/0037048 A1 | 2/2003 | Kabra et al. | |
| 2007/0001869 A1 | 1/2007 | Hunzinger | |
| 2014/0258645 A1* | 9/2014 | Dice | G06F 9/467 711/152 |

(Continued)

OTHER PUBLICATIONS

Jaiprakash, Verma et al; "Survey on Mongodb: An Open-Source Document Database"; International Journal of Advanced Research in Engineering and Technology; Dec. 1, 2015, 12 pages.

(Continued)

*Primary Examiner* — Apu M Mofiz
*Assistant Examiner* — Cindy Nguyen
(74) *Attorney, Agent, or Firm* — Nicholson De Vos Webster & Elliott LLP

(57) ABSTRACT

Techniques are described for a nearest neighbor search service that enables users to perform nearest neighbor searches. The nearest neighbor search service includes an interface that enables users to create collections of searchable vectors, add and update vectors to a collection, delete vectors from a collection, and perform searches for nearest neighbors to a given vector. The nearest neighbor search service enables users to add, update, and delete vectors of a collection in real-time while also enabling users to perform searches at the same time.

20 Claims, 12 Drawing Sheets

(56) References Cited

U.S. PATENT DOCUMENTS

2016/0223341 A1* 8/2016 Engelen .............. H05B 47/105

OTHER PUBLICATIONS

Ensimag; "Studying Data Sharding Using MongoDB"; Dec. 31, 2015; Retrieved from the Internet: http://vargas-solar.com/data-management-services-cloud/wp-content/uploads/sites/32/2015/01/Ex1-2D02Handin.pdf [retrieved on May 27, 2019], 12 pages.
Anonymous; "Methods & Tools"; Jul. 31, 2009; Retrieved from the Internet: http://www.methodsandtools.com/PDF/mt200901.pdf [retrieved on May 27, 2019], 84 pages.
International Search Report and Written Opinion for related International Application No. PCT/US2019/023593, dated Jun. 13, 2019, 16 pages.
Non-Final Office Action, U.S. Appl. No. 15/934,277, dated Jul. 23, 2020, 7 pages.

* cited by examiner

| VECTOR ID | READ LOCK | WRITE LOCK | NODE | NODE PTR |
|---|---|---|---|---|
| 45 | N | N | N1 | N12 |
| 63 | N | N | N12 | N1 |
| 6 | N | N | N7 | N44 |
| ... | ... | ... | ... | ... |
| 33 | N | | N44 | N7 |

US 11,093,497 B1

NEAREST NEIGHBOR SEARCH AS A SERVICE

BACKGROUND

Finding nearest neighbors of a given vector in a sample set of vectors is a common problem in machine learning, particularly in applications that involve pattern matching. A k-nearest neighbor search finds the k vectors that are the closest (or most similar) to a given vector, where k can be any value less than the total number of vectors in the sample set.

BRIEF DESCRIPTION OF DRAWINGS

Various embodiments in accordance with the present disclosure will be described with reference to the drawings, in which.

DETAILED DESCRIPTION

Figure 1:
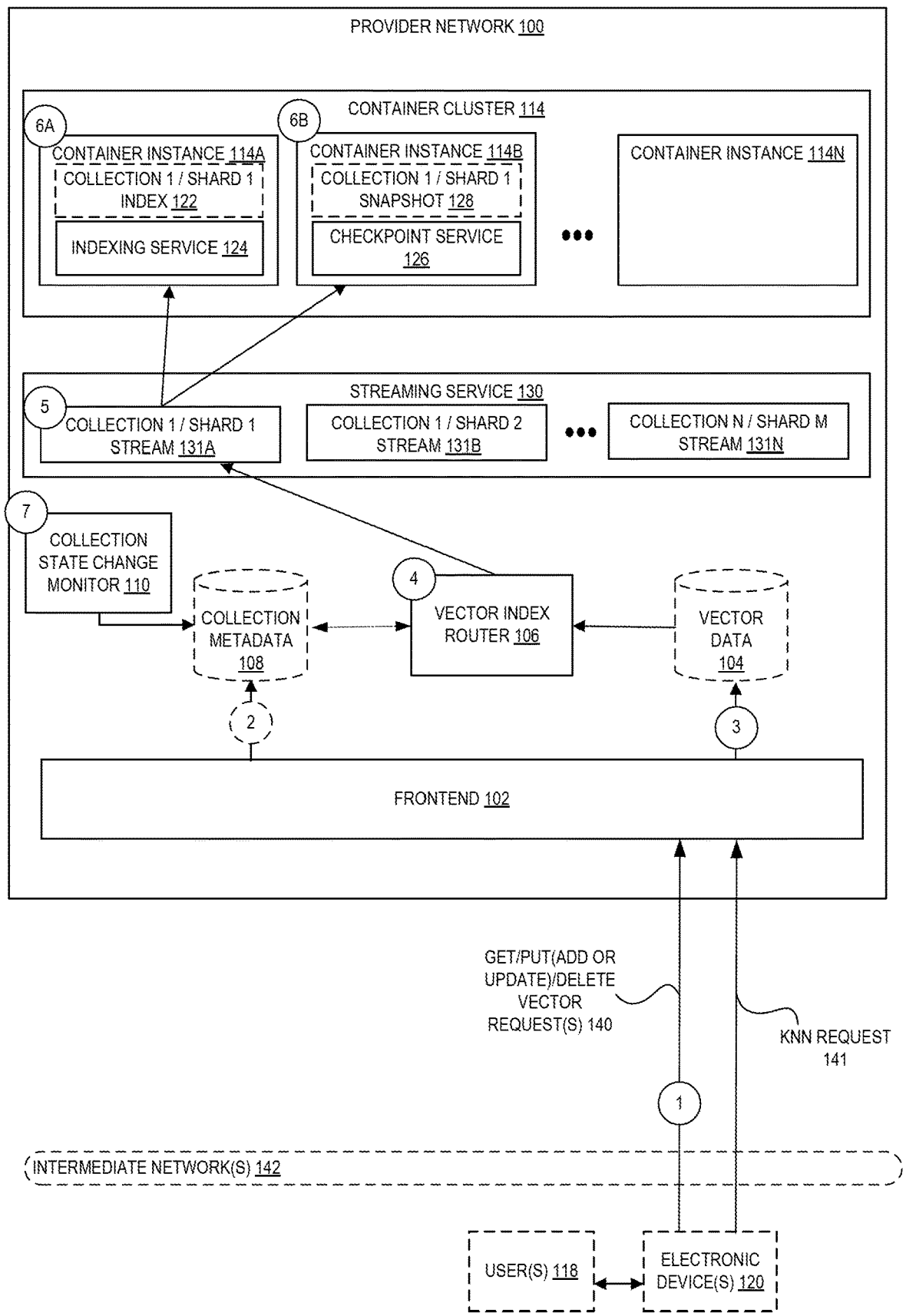
FIG. 1 is a diagram illustrating an environment including a nearest neighbor search service that enables users to perform nearest neighbor searches according to some embodiments.

Various embodiments of methods, apparatus, systems, and non-transitory computer-readable storage media are described for a nearest neighbor search service that enables users to perform nearest neighbor searches. According to embodiments described herein, the nearest neighbor search service includes an interface that enables users to create collections of searchable vectors, add and update vectors to a collection, delete vectors from a collection, and perform searches for nearest neighbors to a given vector. In one embodiment, the nearest neighbor search service enables users to add, update, and delete vectors of a collection in real-time while also enabling users to perform searches at the same time.

As indicated above, finding nearest neighbors for a given vector in a collection of vectors is a common problem in machine learning. Many different algorithms exist for performing nearest neighbor searches and these algorithms can be broadly classified into exact or approximate algorithms. Most algorithms used to perform nearest neighbor searches represent a collection of searchable vectors as a graph-based data structure. In one embodiment, the nearest neighbor search service described herein enables users to perform nearest neighbor searches using the Hierarchical Navigable Small World (HNSW) algorithm, which provides an approximate solution with very high recall; however, such a service generally can support any type of algorithm. The HNSW algorithm creates a graph of the vectors using Dijkstra's algorithm and stores the graph in memory. As the number of vectors supported by this service may be on the order of millions, the indexing takes on the order of a minute and the index sizes are on the order of gigabytes.

In an embodiment, a collection of vectors represents a set of points in an n-dimensional space. In some embodiments, the collection of vectors are graphs. Here, recall is defined as the fraction of the number of vectors returned that are actually the nearest neighbors to a queried vector out of the total possible nearest neighbor vectors. In an embodiment, a user uses the nearest neighbor service by requesting actions relative to a collection. For example, a user may create collections, add vectors to the collection, querying the collection for nearest neighbors. In an embodiment, a customer's account may be associated with tens or thousands of collections. The service gets approximate nearest neighbors with high recall. The service strives for query latency of less than 100 milliseconds irrespective of the collection size.

Today, applications used to perform nearest neighbor searches do not enable users to perform incremental updates, that is, adding, deleting, and updating vectors, while at the same time allowing queries to be performed against a collection. One possibility for allowing users to update a collection is to lock the entire graph and to apply the updates while queries are blocked. However, such an implementation is inconvenient for users desiring to perform searches in real-time while a graph is being updated. According to embodiments described herein, incremental updates of vectors of a k-nearest neighbors (kNN) graph are supported in a way that minimizes the lock granularity while avoiding deadlocks.

FIG. 1 is an example environment for a service of a service provider system that enables users 118 to create searchable collections of vectors, to add, update, and delete vectors from a collection, and to perform nearest neighbor searches on a collection. In an embodiment, a nearest neighbor search service includes a frontend 102, a vector index router 106, a collection state change monitor 110, a streaming service 130, and a container cluster 114, each operating as part of a service provider network 100 and each comprising one or more software modules executed by one or more electronic devices at one or more data centers and geographic locations.

A provider network 100 provides users 118 with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (for example, configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. The users (or "customers") of provider networks 100 may utilize one or more user accounts that are associated with a customer account, though these terms may be used somewhat interchangeably depending upon the context of use. Users 118 may interact with a provider network 100 across one or more intermediate networks 142 (e.g., the internet) via a frontend 102, such as through use of application programming interface (API) calls, via a console implemented as a website or application, etc. In some embodiments, the frontend 102 may be part of a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user 118 may directly utilize a compute instance hosted by the service provider system to perform a variety of computing tasks, or may indirectly utilize a compute instance by submitting code to be executed by the service provider system, which in turn utilizes a compute instance to execute the code (typically without the user 118 having any control of or knowledge of the underlying compute instance(s) involved).

As indicated above, a nearest neighbor search service enables users to create collections of searchable vectors, to add, update, and delete vectors from a collection, and to submit nearest neighbor search requests for a given vector. The example system shown in FIG. 1 assumes that a user 118 has created a collection and added vectors to the collection. For example, a user 118 may have used a computing device 120 to generate a create collection request and to upload or otherwise provide the nearest neighbor search service with vector data for the collection. In one embodiment, the vector data for the collection is stored as vector data 104 in a database or other type of storage. The nearest neighbor search service creates the collection, stores information about the collection in collection metadata 108 (including an identifier of the collection, a collection name, a created date, and so forth), creates a graph or index for the associated vector data (for example, using Djikstra's algorithm), and partitions the graph or index into a plurality of shards.

Once a collection has been created, a user 118 can generate requests to add, modify (update), get, or delete vectors from the collection. For example, at circle "1" in FIG. 1, a user 118 uses a computing device 120 to generate a put vector request 140. In an embodiment, a put request identifying a vector adds the vector to the collection if it does not already exist or modifies an existing vector if it does exist in the collection. In other embodiments, separate add and update requests may be used. In FIG. 1, the put request 140 is received by the frontend 102, which routes requests to the appropriate components of the nearest neighbor search service.

In some embodiments, at circle "2," the frontend 102 queries collection metadata 108 in response to receiving the put request 140 for the address of the collection (for example, shard address(es)). The collection metadata 108 may include information for each collection including an account identifier associated with the collection, a name for the collection, an identifier of the collection, a number of dimensions associated with the collection, a date the collection was created, a date the collection was last updated, a state of the collection (for example, created, update in progress, deletion in progress), and location identifiers of data associated with the collection (such as IP addresses).

In an embodiment, at circle "3," the frontend 102 updates information for the identified vector at the vector data 104 if the vector already exists in the vector data 104 or adds the vector to the vector data 104 if it does not exist. The vector data 104 includes the vectors of the collection, and in some embodiments, an address of the vector.

In an embodiment, at circle "4," a vector index router 106 monitors and consumes updates to the vector data 104. When the vector index router 106 detects one or more updates to the vector data 104, the router forwards the updates to a data stream managed by a data streaming service 130. In one embodiment, the streaming service 130 includes a separate data stream for each shard of a collection and the vector index router 106 forwards the update information to the data stream associated with the shard containing a graph node representing the identified vector. For example, in FIG. 1, the vector index router 106 consumes an update to the vector data 104 based on the request 140, identifies the shard associated with the vector identified in the request (in this example, shard 1 of collection 1), and forwards the update information to stream 131A associated with the identified shard. In some embodiments, the collection metadata 108 is coupled to the vector index router 106. Together, these components track which stream to forward a request to.

In an embodiment, at circle "5," the data stream 131A forwards the update information to two separate containers 114A, 114B running in a container service, one container running an indexing service 124 and the other container running a checkpoint service 126. In other embodiments, the services may run in a same container or be spread across even more containers. In general, the container(s) to which the data is forwarded by the data stream correspond to the shard of the graph containing a node representing the vector to be updated.

In an embodiment, at circle "6A," the indexing service 124 running in the container 114A reads the updates from the stream 131A and updates the corresponding index 122. For example, the indexing service 124 may update the corresponding index 122 again using Djikstra's algorithm or other techniques. In an embodiment, at circle "6B," the checkpoint service 126 reads the updates from the stream 131A and updates the index and the vectors of the collection. In an embodiment, the checkpoint service 126 periodically takes a snapshot of the index and vector set (for example, as stored by the container 114A or separately the container 114B) and uploads the snapshot to a storage location.

In an embodiment, at circle "7," a collection state change monitor 110 monitors for changes to a collection (for example, changes made in response to a put vector request 140) and updates the collection metadata 108. For example, the collection state change monitor 110 may update a collection state value while an update is in progress, update the collection state value once updates are complete, modify a last update time associated with the collection, and so forth.

In some embodiments, kNN requests 141 go through the frontend 102, but do not go through the streaming service 130.

Figure 2:
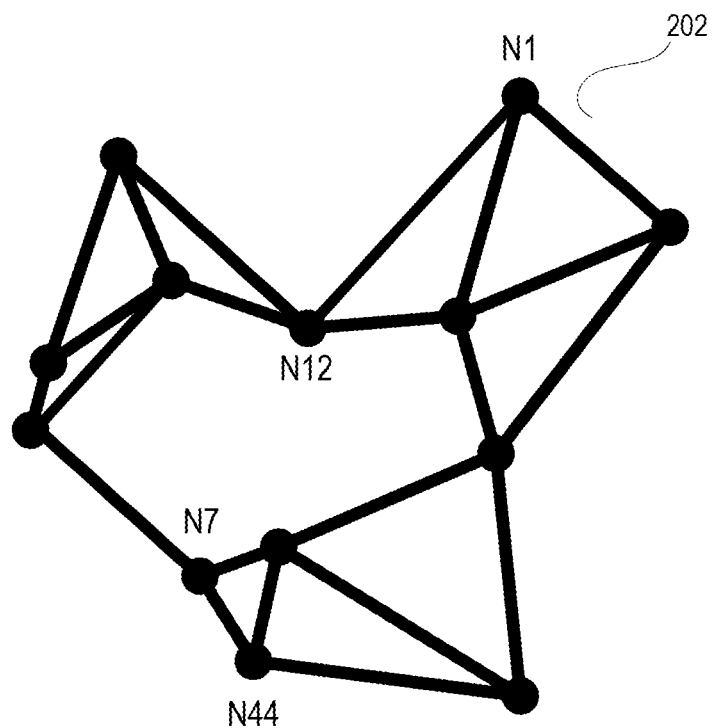
FIG. 2 is an example of a node table and a corresponding graph according to some embodiments.

FIG. 2 is a diagram illustrating a data structure used to enable incremental changes to a graph according to some embodiments. In some embodiments, accesses to a graph data structure are made in batches, that is, the entire graph data structure (or at least a shard thereof) is locked so that many changes (add/delete/update) and/or vector requests (kNN, get) are made at once without causing a data integrity issue.

In embodiments that use the data structure 200 (or "node table") described herein, the data structure 200 acts as an intermediary to handle a request to act on the graph. That is, instead of direct puts, reads, etc. to a given node in the graph, the request is first subjected to an analysis of the data structure 200 to determine whether the request may be fulfilled at that time. For example, if there is a write to a particular node, it would not be beneficial to read from that node at the same time. This data structure prevents acts like that. The data structure 200 allows for incremental (and not batch) accesses to the graph.

In an embodiment, a node (or mapping) table 200 includes at least one entry for each vector contained in a graph (index) 202 representing a collection of vectors and their connections. In one embodiment, an entry in the table includes fields including a read lock field, a write lock field, a vector identifier field, and a node pointer(s) field.

The read lock field indicates whether the associated node in the graph is locked for reads. For example, a reader acquires a read lock on the node corresponding to the vector identifier in the node table and releases the lock after the vector is read into memory. The read lock ensures that the node is not deleted or modified when the read operation is in progress.

The write lock field indicates whether the associated node in the graph is locked for writes. For example, a writer acquires a write lock on the node corresponding to the vector identifier in the node table and releases the lock when the vector is stored into the graph 202. The write lock ensures that the node is not modified by another request while writing is in progress. This is useful for both addition of new vectors as well as for nearest neighbor queries.

The vector identifier field (vector ID) is typically used as an index into the node table 200. The vector IDs are typically included in many requests (get, put, update, delete, kNN, etc.). In some embodiments, a vector ID takes the place of what would normally be a location of a node in the graph 202.

The node pointer field stores a pointer to a location of a neighboring node in the graph 202. In some embodiments, a data structure 200 includes a separate entry for each neighbor relationship in the graph 202. For example, if a node N3 has neighbors N5 and N8, then the data structure 200 may store one entry for the relationship between N3 and N5 and a separate entry for N3 and N8. In other embodiments, a data structure 200 includes a separate entry for each node in the graph 202 and the node pointer field stores one or more pointers for each neighboring node. Referring again to the example above, the data structure 200 may store a single entry for node N3 where the node pointer field stores pointers to both N5 and N8.

Figure 3:
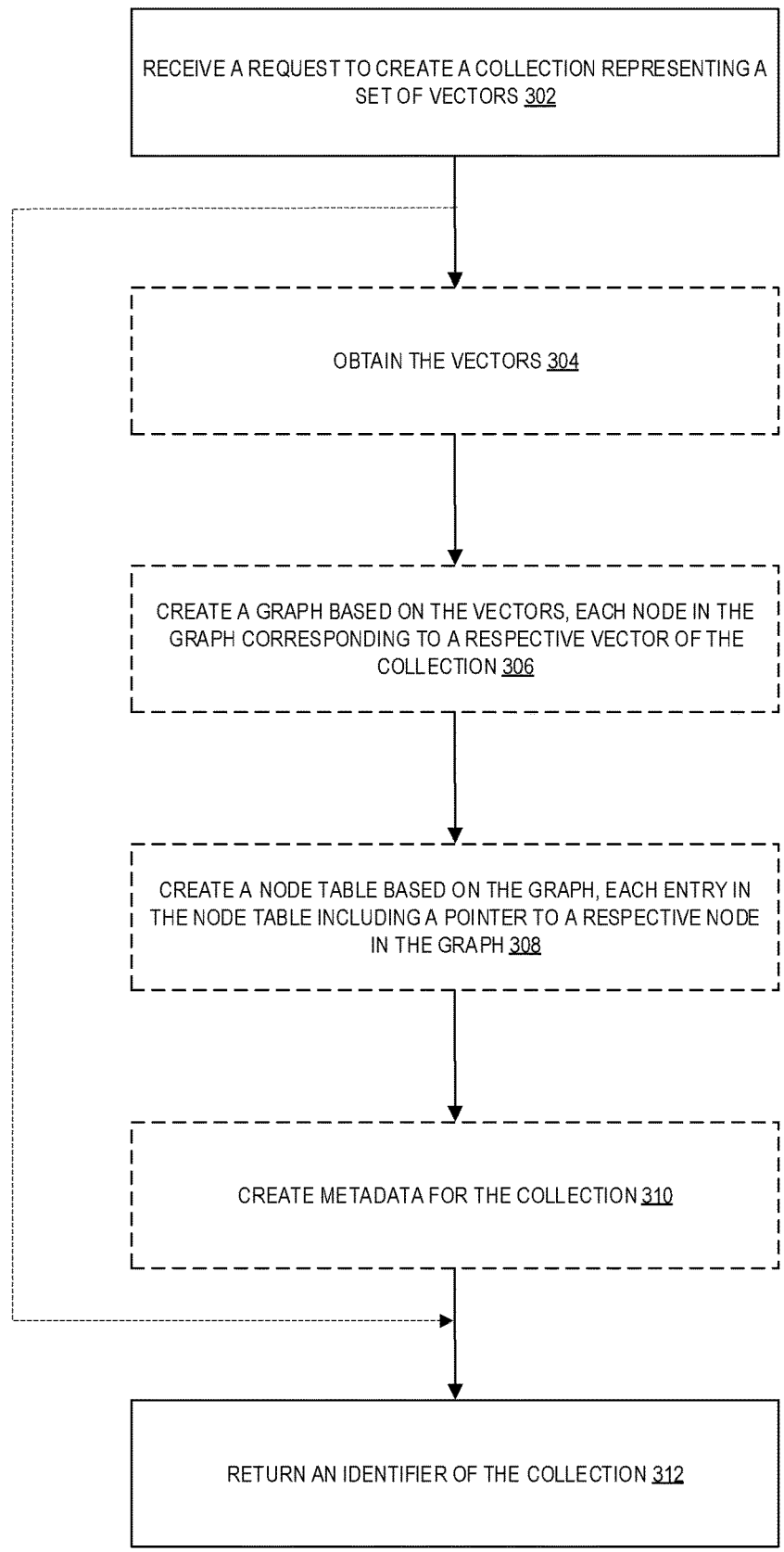
FIG. 3 is a flow diagram illustrating example operations performed by a nearest neighbor search service in response to receiving a request to create a searchable collection of vectors according to some embodiments.

FIG. 3 is a flow diagram illustrating operations 300 performed in response to receiving a request to create a collection of vectors according to some embodiments. Some or all of the operations 300 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 300 are performed by the frontend of the other figures.

The operations 300 include, at block 302, receiving a request to create a collection representing a set of vectors. For example, referring to FIG. 1, a user 118 may use a computing device 120 to generate the request using a graphical user interface (GUI), API, command line interface (CLI), or other interface provided by the service provider network 100.

In an embodiment, at block 304, the nearest neighbor search service obtains vectors to add to the collection. For example, a user 118 may use the computing device 120 to upload the vectors to the nearest neighbor search service or to provide an identifier of a location where the vectors are stored.

In an embodiment, at block 306, the nearest neighbor search service creates a graph based on the vectors, where each node in the graph corresponds to a respective vector of the collection. In one embodiment, the graph is created using Dijkstra's algorithm and stored in a form that is usable by the HNSW algorithm.

In an embodiment, at block 308, the nearest neighbor search service creates a node table based on the graph, each entry in the node table including a pointer to a respective node in the graph. For example, the service may create a table in a database or other data store. As shown in FIG. 2, a node table may include entries corresponding to the vectors comprising a graph. In an embodiment, each entry may include fields as detailed above.

In an embodiment, at block 310, the service creates metadata for the collection.

In an embodiment, at block 312, the service returns an identifier of the collection. In some embodiments, the actions of 304-310 are skipped, for example, because the user intends to provide the vector data to the service at a later time.

Figure 4:
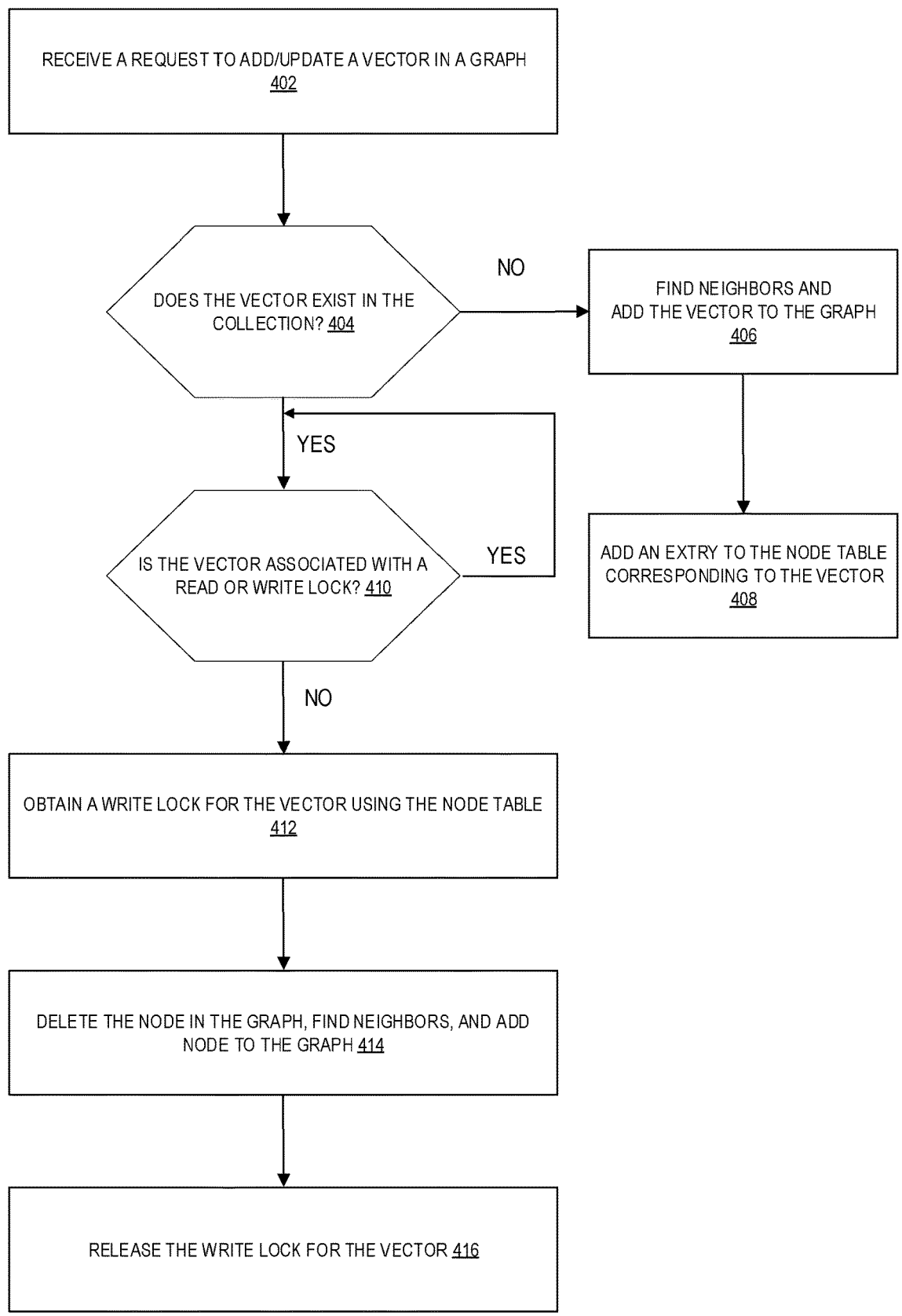
FIG. 4 is a flow diagram illustrating example operations performed by a nearest neighbor search service in response to receiving a request to add or update a vector in a collection of vectors according to some embodiments.

FIG. 4 is a flow diagram illustrating a method performed in response to receiving a request to add or update a vector according to some embodiments. In some embodiments, the method is performed by a checkpoint service.

In an embodiment, at block 402, the service receives a request to add or update a vector in a graph. In some embodiments, the request is to update a vector in a collection and includes an identifier of the collection and the vector. In some embodiments, the operations of the method are performed with respect to a particular collection, wherein an identifier of the collection is indicated by the request.

In an embodiment, at block 404, the service determines whether the vector exists in the collection.

In an embodiment, if the service determines that the vector does not exist in the collection, at block 406, the service adds the vector to the graph. In some embodiments, adding the vector to the graph includes adding a new node to the graph having the vector value and recalculating edges between nodes impacted by the addition. Impacted nodes at least include nodes that share an edge with the updated node. In some embodiments, the edge recalculation is performed using Dijkstra's algorithm. At block 408, the service adds an entry to the node table corresponding to the vector including adding a new node pointer value.

If the service determines that the vector does exist in the collection, at block 410, the service determines whether an entry in a mapping data structure (such as the node table detailed) associated with the vector has a set read or write lock. In an embodiment, the service determines whether the entry has a set read or write lock by locating an entry in the node table corresponding to the vector identifier and determining whether a lock is specified.

In an embodiment, if the service determines that the vector is associated with either a read or write lock, the service waits for the read or write lock to be released.

In an embodiment, if the service determines that the vector is not associated with either a read or a write lock, at block 412, the service obtains a write lock for the vector by setting the lock in the node table.

In an embodiment, once the service has obtained the write lock, at block 414, the service updates a node associated with the vector in the graph. In some embodiments, updating the graph includes changing at least one value associated with the node (vector value) and recalculating edges between nodes impacted by the change Impacted nodes at least include nodes that share an edge with the updated node. In some embodiments, the edge recalculation is performed using Dijkstra's algorithm.

In an embodiment, once the service has updated the vector in the graph, at block 416, the service uses the node table to release the write lock for the vector.

Figure 5:
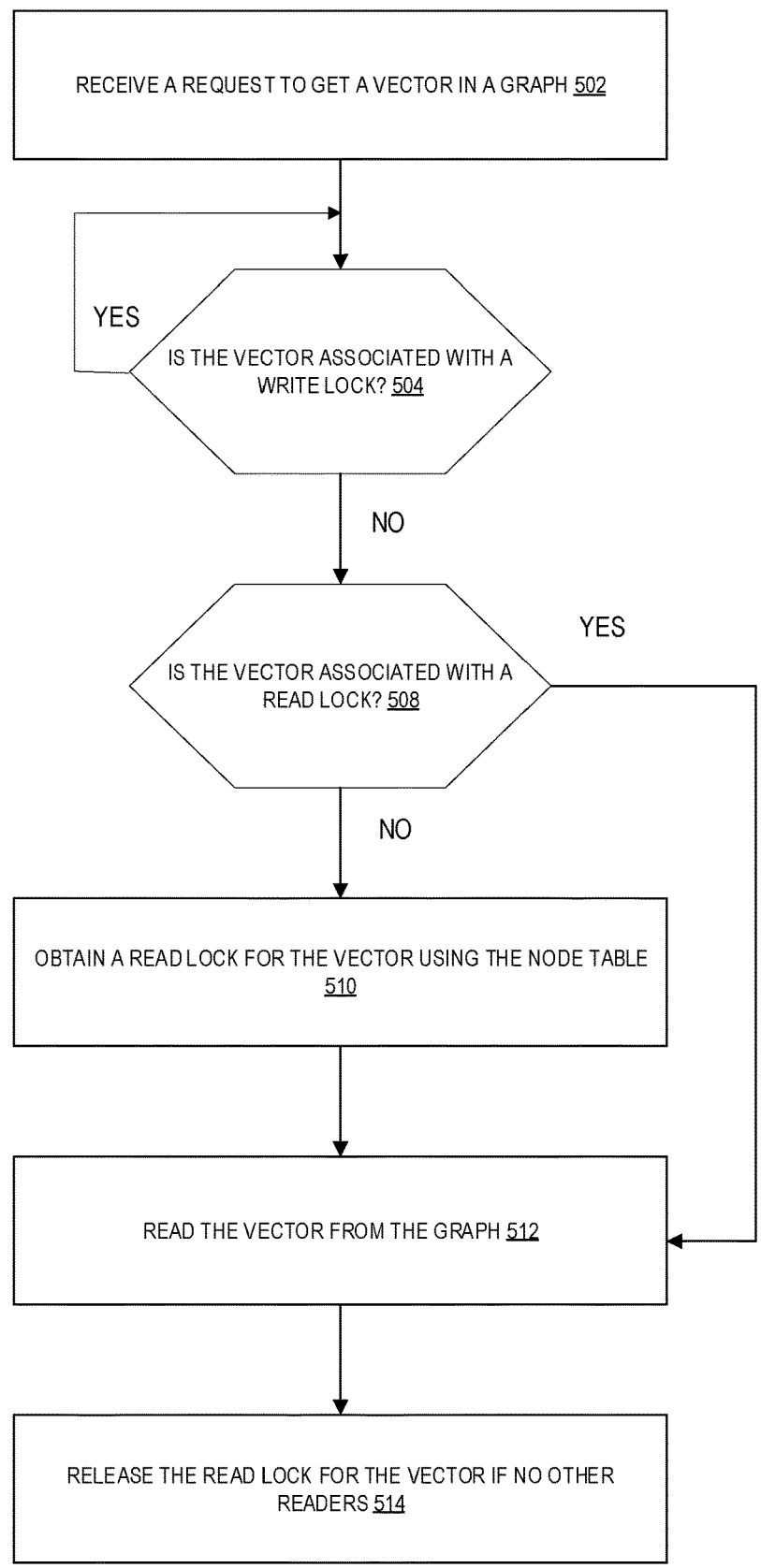
FIG. 5 is a flow diagram illustrating example operations performed by a nearest neighbor search service in response to receiving a request to get a vector from a collection according to some embodiments.

FIG. 5 is a flow diagram illustrating a method performed in response to receiving a request to get a vector from the graph according to some embodiments. In some embodiments, the method is performed by a checkpoint service.

In an embodiment, at block 502, the service receives a request to get a vector in a graph. In some embodiments, the request is to get a vector in a collection and includes an identifier of the vector. In some embodiments, the operations of the method are performed with respect to a particular collection, wherein an identifier of the collection is indicated by the request.

In some embodiments, at block 504, the service determines whether there is a write lock associated with the vector. For example, the service looks at the node table to see if the entry for the vector (indexed by the vector identifier) has a write lock. A write lock means that there cannot be a change impacting a node where the vector data resides. Without such a lock, a request to get the vector could access a node with a changing value. When there is a write lock, the service waits for the write lock to be released.

When there is not a write lock, the service determines whether there is a read lock associated with the vector at block 508. For example, the service looks at the node table to see if the entry for the vector (indexed by the vector identifier) has a read lock. A read lock prevents changes impacting the node where the vector data resides while an operation is being performed. Without such a lock, a request to get the vector could access a node with a changing value. If there is already an existing read lock (for example, obtained by another request), the service proceeds to read the vector from the graph at block 512.

When there is not a read lock, one is obtained at block 510. For example, the service sets the read lock in the node table of the entry for the vector (indexed by the vector identifier).

At block 512, the node pointed to by the node table entry is read and the vector value is returned to the requestor. This reading only occurs when a read lock exists.

The read lock for the entry for the vector (indexed by the vector identifier) is released at block 514.

Figure 6:
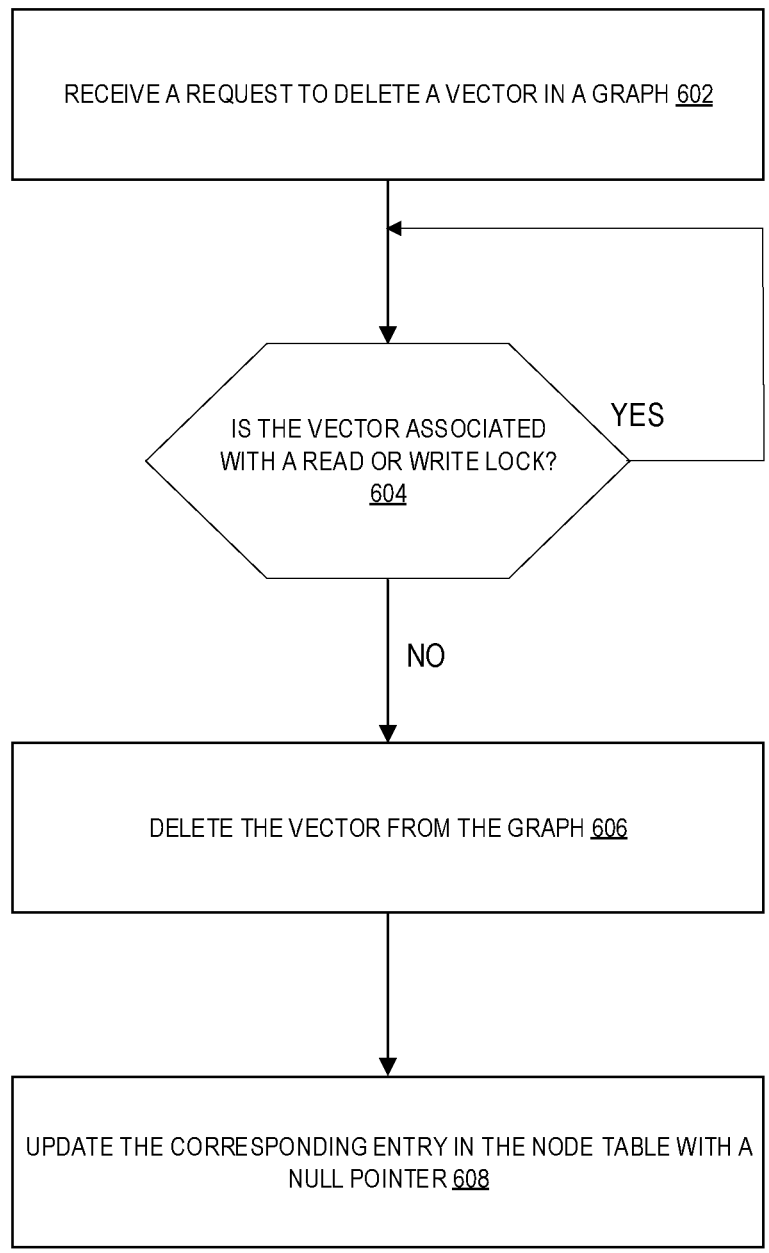
FIG. 6 is a flow diagram illustrating example operations performed by a nearest neighbor search service in response to receiving a request to delete a vector from a collection according to some embodiments.

FIG. 6 is a flow diagram illustrating a method performed in response to receiving a request to delete a vector from the graph according to some embodiments. In some embodiments, the method is performed by a checkpoint service.

In an embodiment, at block 602, the service receives a request to delete a vector in a graph. In some embodiments, the request to delete a vector in a collection includes an identifier of the vector. In some embodiments, the operations of the method are performed with respect to a particular collection, wherein an identifier of the collection is indicated by the request.

In some embodiments, at block 604, the service determines whether there is a write lock or a read lock associated with the vector. For example, the service looks at the node table to see if the entry for the vector (indexed by the vector identifier) has a lock.

When there is a lock, the service waits for the lock to clear. When there is not a lock, the service deletes the node associated with the vector from the graph at block 606. In some embodiments, edges between nodes impacted by the deletion are recalculated. Impacted nodes at least include nodes that share an edge with the deleted node. In some embodiments, the edge recalculation is performed using Dijkstra's algorithm.

The entry in the node table for the deleted node has its node pointer set to null at block 608.

Figure 7:
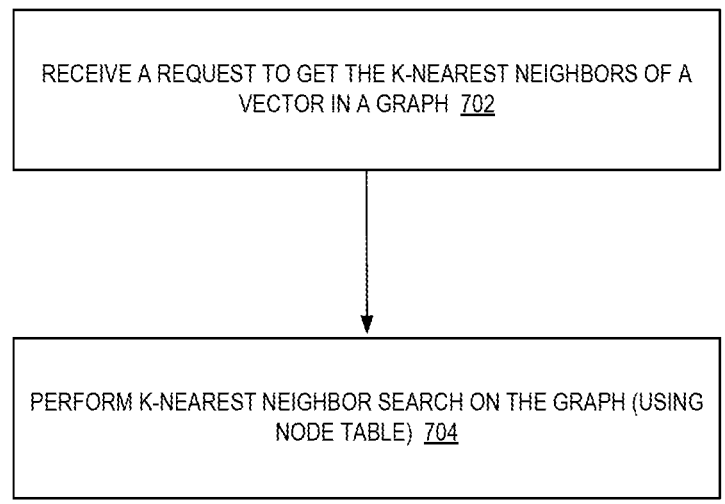
FIG. 7 is a flow diagram illustrating example operations performed by a nearest neighbor search service in response to receiving a get k-nearest neighbors request according to some embodiments.

FIG. 7 is a flow diagram illustrating a method performed in response to receiving a request to perform a k-nearest neighbor (kNN) search of a vector from the graph according to some embodiments. In some embodiments, the method is performed by a checkpoint service.

In an embodiment, at block 702, the service receives a request to perform a kNN search for a vector in a graph. In some embodiments, the request includes an identifier of the vector for which the search is to be performed. In some embodiments, the operations of the method are performed with respect to a particular collection, wherein an identifier of the collection is indicated by the request.

In some embodiments, at block 704, the service performs the kNN search in the graph using for the node identified by the node table using the identifier of the vector and returns the result of the kNN search to the requestor.

Figure 8:
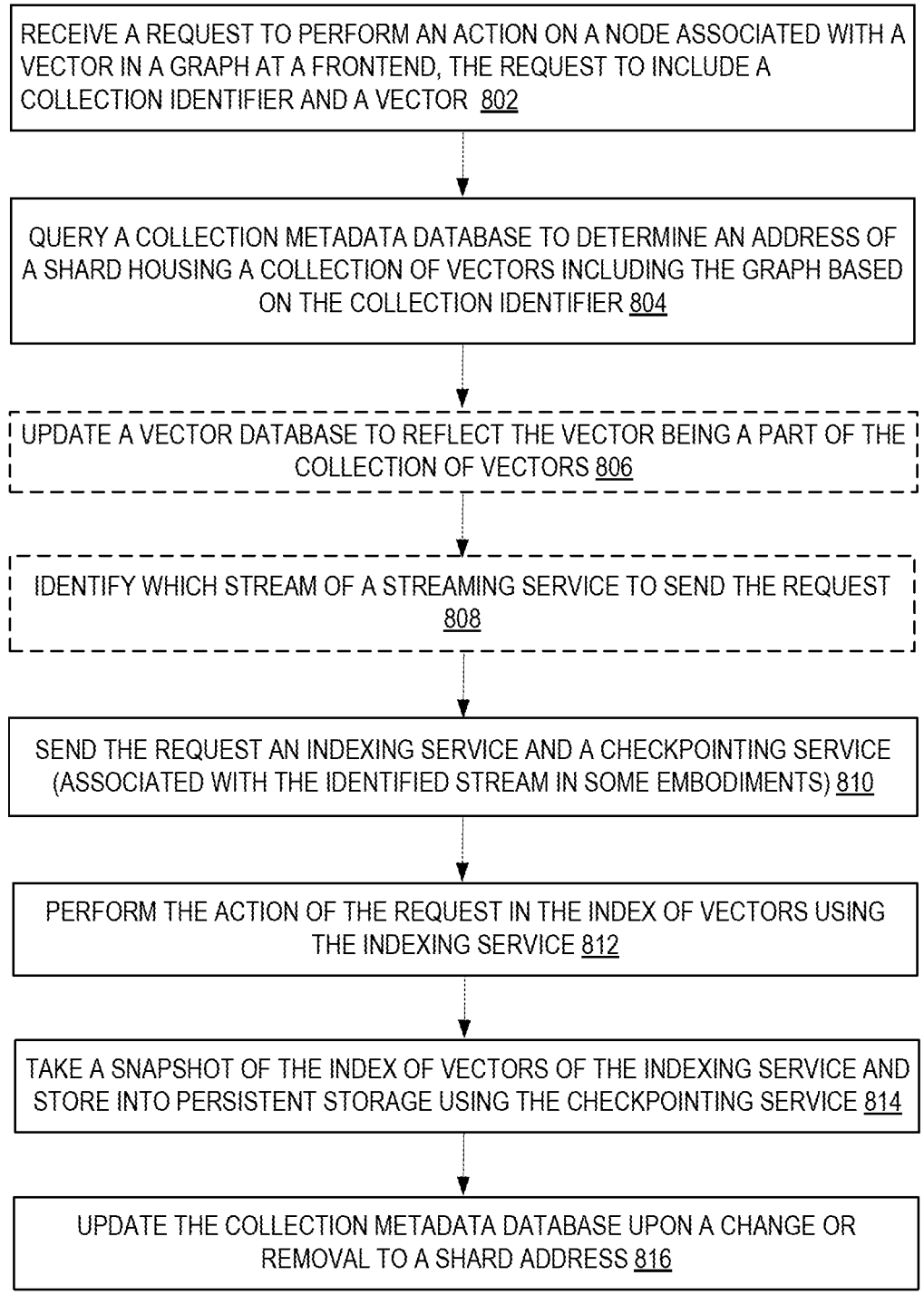
FIG. 8 illustrates a method of usage of nearest neighbors service for non-kNN requests according to some embodiments.

FIG. 8 illustrates embodiments of a method of usage of nearest neighbors service for non-kNN requests. At block 802, a request is received at the frontend 102 to update a node associated with a vector in a graph. The request at least includes a collection identifier. In some embodiments, depending on the request type, the request includes a vector identifier and a vector.

The collection metadata database 108 is queried to determine an address of a shard housing a collection of vectors including the graph based on the collection identifier of the request at block 804.

In some embodiments, the vector database 104 is updated to reflect the vector being a part of the collection of vectors at block 806.

In some embodiments, the stream of the streaming service 130 to send the request is identified at block 808. For example, the vector index router 106 identifies which stream 131A-131N of the streaming service 130 to send the request to.

The request is sent to an indexing service 124 and a checkpoint service 126 at block 810. In some embodiments, a stream services these services 124 and 126.

At block 812, the graph associated with the indexing service 124 is acted on. For example, a node is added, deleted, updated, etc. from the graph.

A snapshot of the graph of the indexing service is taken and stored into persistent storage using the checkpoint service 126 at block 814.

Upon a change or removal to a shard address, the collection metadata database 108 is updated at block 816.

Figure 9:
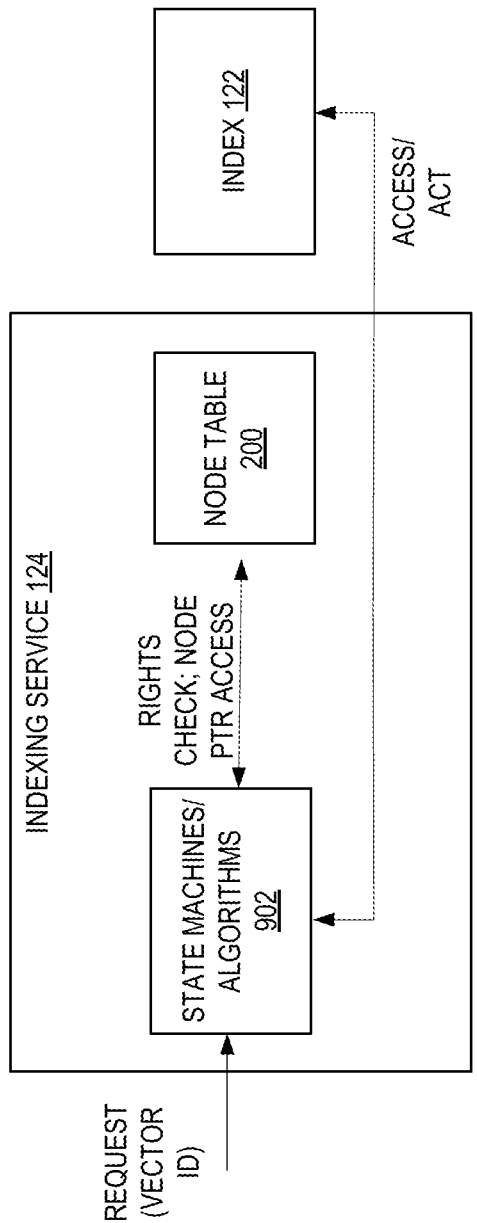
FIG. 9 illustrates an indexing service using a node table according to some embodiments.

FIG. 9 illustrates embodiments of an indexing service 124 using a node table 200. As shown, a request (such as a put request) to perform an act is received by the indexing service 124. The request is an input to a state machine or algorithm 902 which dictates the operations to be performed for the act. The request at least includes a vector identifier. Examples of the methods of the state machines or algorithms are detailed with respect to FIGS. 4-7.

The state machine or algorithm 902 performs a rights check of the lock indications of the node table 200 using the vector identifier. Depending upon the requested act, the lock indications dictate whether the act can occur.

The state machine or algorithm 902 also gets the node pointer from the node table 200 and uses this pointer to access the index 122 to perform the requested act.

Figure 10:
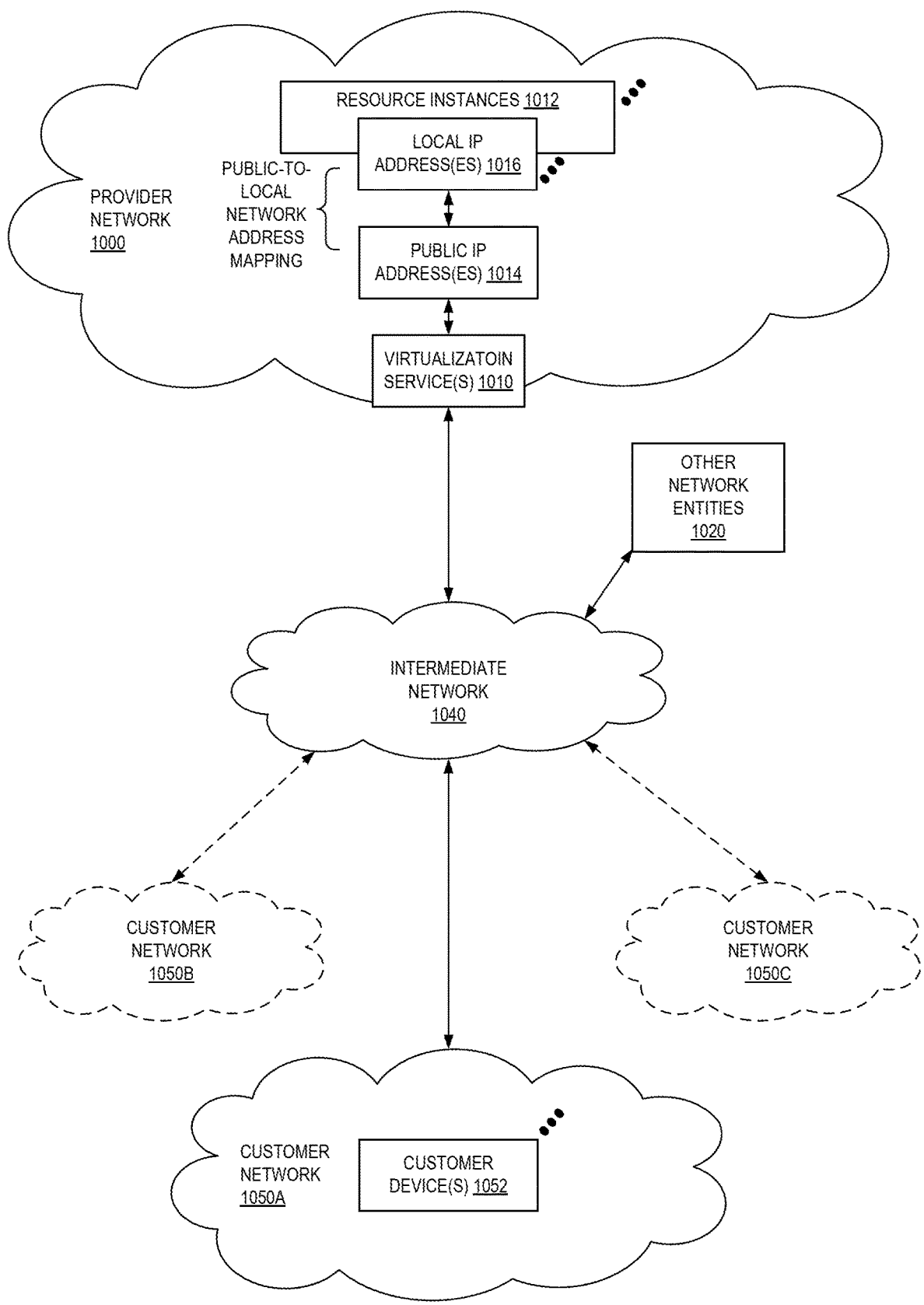
FIG. 10 illustrates an example provider network environment according to some embodiments.

FIG. 10 illustrates an example provider network (or "service provider system") environment according to some embodiments. A provider network 1000 may provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local IP addresses 1016 may be associated with the resource instances 1012; the local IP addresses are the internal network addresses of the resource instances 1012 on the provider network 1000. In some embodiments, the provider network 1000 may also provide public IP addresses 1014 and/or public IP address ranges (e.g., Internet Protocol version 4 (IPv4) or Internet Protocol version 6 (IPv6) addresses) that customers may obtain from the provider 1000.

Conventionally, the provider network 1000, via the virtualization services 1010, may allow a customer of the service provider (e.g., a customer that operates one or more client networks 1050A-1050C including one or more customer device(s) 1052) to dynamically associate at least some public IP addresses 1014 assigned or allocated to the customer with particular resource instances 1012 assigned to the customer. The provider network 1000 may also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of customer network(s) 1050A-1050C may, for example, implement customer-specific applications and present the customer's applications on an intermediate network 1040, such as the Internet. Other network entities 1020 on the intermediate network 1040 may then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 may be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1000; a customer may then assign their allocated public IP addresses to particular resource instances allocated to the customer. These public IP addresses may be referred to as customer public IP addresses, or simply customer IP addresses. Instead of being assigned by the provider network 1000 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
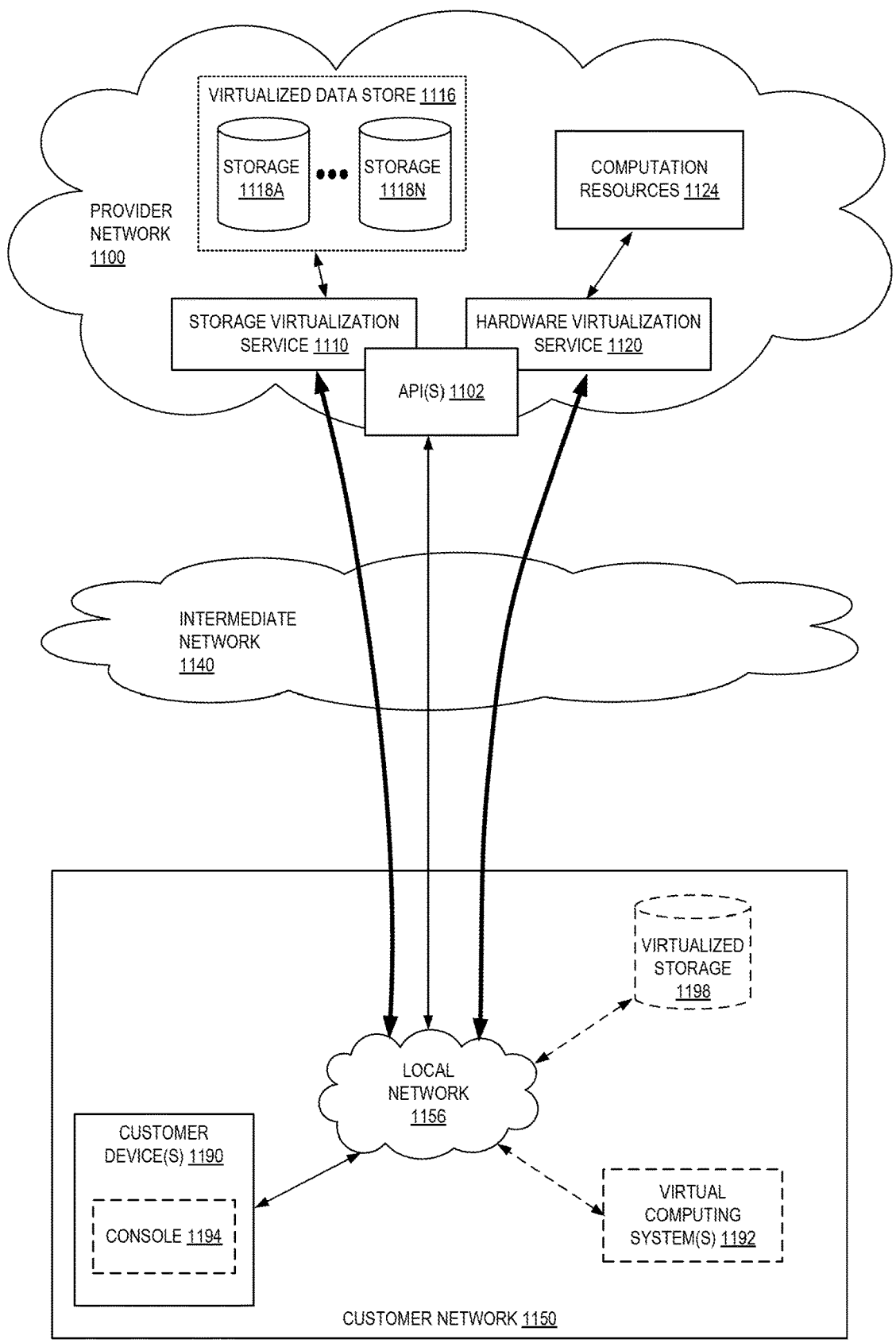
FIG. 11 is a block diagram of an example provider network that provides a storage virtualization service and a hardware virtualization service to customers according to some embodiments.

FIG. 11 is a block diagram of an example provider network that provides a storage virtualization service and a hardware virtualization service to customers, according to some embodiments. Hardware virtualization service 1120 provides multiple computation resources 1124 (e.g., VMs) to customers. The computation resources 1124 may, for example, be rented or leased to customers of the provider network 1100 (e.g., to a customer that implements customer network 1150). Each computation resource 1124 may be provided with one or more local IP addresses. Provider network 1100 may be configured to route packets from the local IP addresses of the computation resources 1124 to public Internet destinations, and from public Internet sources to the local IP addresses of computation resources 1124.

Provider network 1100 may provide a customer network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a customer network 1150 may access functionality provided by the hardware virtualization service 1120, for example via a console 1194 (e.g., a web-based application, standalone application, mobile application, etc.). In some embodiments, at the provider network 1100, each virtual computing system 1192 at customer network 1150 may correspond to a computation resource 1124 that is leased, rented, or otherwise provided to customer network 1150.

From an instance of a virtual computing system 1192 and/or another customer device 1190 (e.g., via console 1194), the customer may access the functionality of storage virtualization service 1110, for example via one or more APIs 1102, to access data from and store data to storage resources 1118A-1118N of a virtual data store 1116 provided by the provider network 1100. In some embodiments, a virtualized data store gateway (not shown) may be provided at the customer network 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In some embodiments, a user, via a virtual computing system 1192 and/or on another customer device 1190, may mount and access virtual data store 1116 volumes, which appear to the user as local virtualized storage 1198.

While not shown in FIG. 11, the virtualization service(s) may also be accessed from resource instances within the provider network 1100 via API(s) 1102. For example, a customer, appliance service provider, or other entity may access a virtualization service from within a respective virtual network on the provider network 1100 via an API 1102 to request allocation of one or more resource instances within the virtual network or within another virtual network.

Illustrative System

Figure 12:
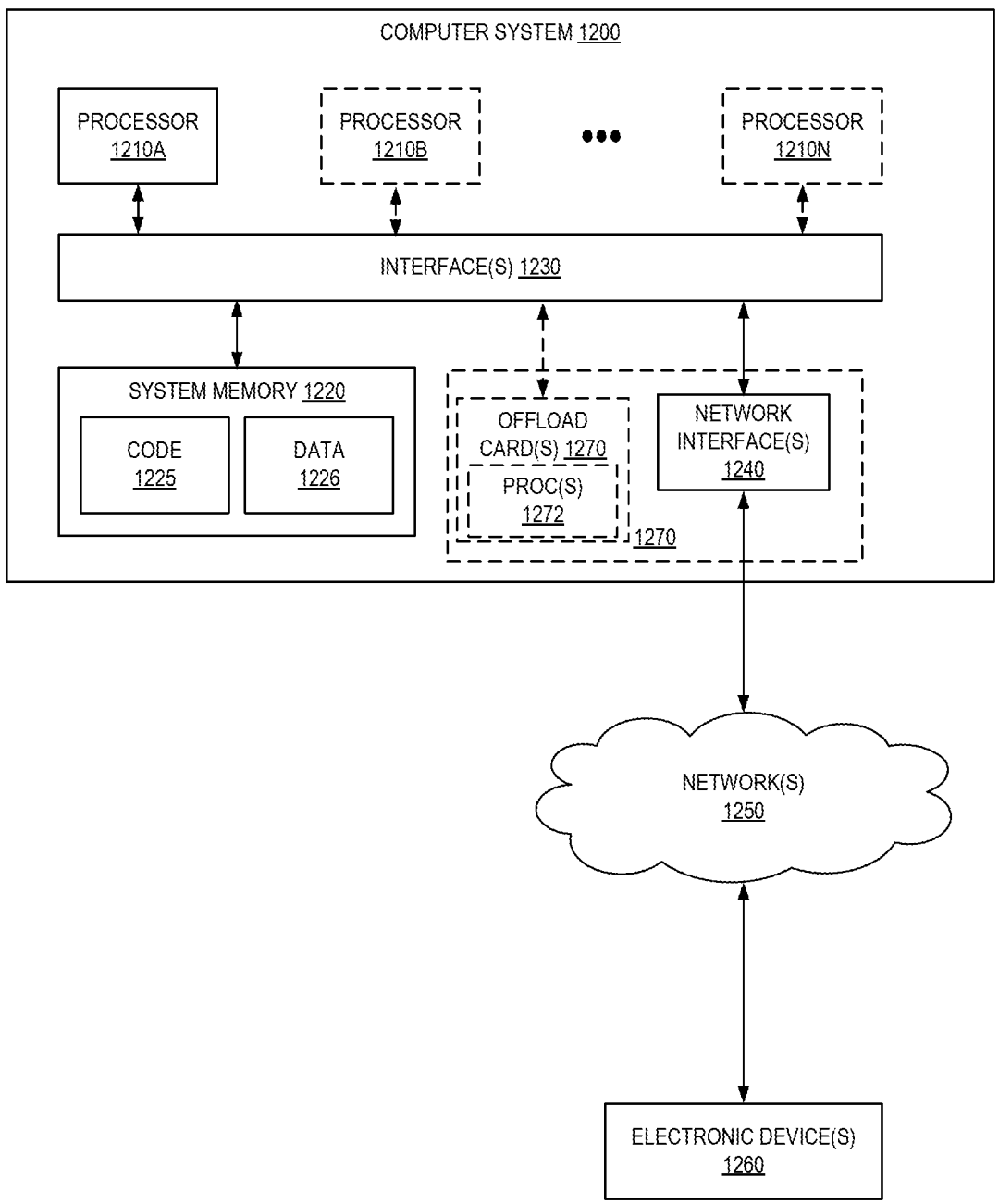
FIG. 12 is a block diagram illustrating an example computer system that may be used in some embodiments.

In some embodiments, a system that implements a portion or all of the techniques for a service enabling nearest neighbor searches as described herein may include a general-purpose computer system that includes or is configured to access one or more computer-accessible media, such as computer system 1200 illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various embodiments a computer system 1200 may include one computing device or any number of computing devices configured to work together as a single computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1210 may commonly, but not necessarily, implement the same ISA.

System memory 1220 may store instructions and data accessible by processor(s) 1210. In various embodiments, system memory 1220 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1220 as code 1225 and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices as illustrated in FIG. 1, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1200 includes one or more offload cards 1270 (including one or more processors 1275, and possibly including the one or more network interfaces 1240) that are connected using an I/O interface 1230 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1200 may act as a host electronic device (e.g., operating as part of a hardware virtualization service) that hosts compute instances, and the one or more offload cards 1270 execute a virtualization manager that can manage compute instances that execute on the host electronic device. As an example, in some embodiments the offload card(s) 1270 can perform compute instance management operations such as pausing and/or un-pausing compute instances, launching and/or terminating compute instances, performing memory transfer/copying operations, etc. These management operations may, in some embodiments, be performed by the offload card(s) 1270 in coordination with a hypervisor (e.g., upon a request from a hypervisor) that is executed by the other processors 1210A-1210N of the computer system 1200. However, in some embodiments the virtualization manager implemented by the offload card(s) 1270 can accommodate requests from other entities, and may not coordinate with (or service) any hypervisor.

In some embodiments, system memory 1220 may be one embodiment of a computer-accessible medium configured to store program instructions and data as described above for FIG. 1 for providing customer hosted endpoints in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 114A-114B) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at a service in a provider network, a request to update a node associated with a vector in a graph, the service hosted on one or more electronic devices including at least one processor;
   determining that an entry for the vector in a node table stored in a data store of the provider network does not have an indication of being locked, each entry in the node table including an indication of a read or write lock usage, a vector identifier, and a pointer to the node in the graph;
   obtaining a lock for the entry for the vector in the node table;
   updating the node in the graph;
   during updating the node in the graph, allowing queries associated with one or more vectors in the graph; and
   releasing the lock for the entry for the vector in the node table.

2. The computer-implemented method of claim 1, wherein updating the node in the graph comprises changing at least one value associated with the node and recalculating edges for nodes impacted by the updating of the node.

3. The computer-implemented method of claim 2, wherein the request to update a node associated with a vector in a graph includes an identifier of the vector and a collection including the vector.

4. A computer-implemented method comprising:
   receiving, at a service in a provider network, a request to perform an action on a node associated with a vector in a graph, the service hosted on one or more electronic devices including at least one processor;
   utilizing a node data structure stored in a data store of the provider network to determine that the action is allowed, the node data structure including a plurality of entries and each entry corresponds to a node in the graph and includes an indication of a read or write lock usage, a vector identifier, and a pointer to the node in the graph;
   performing the action; and
   during performing the action, allowing queries associated with one or more vectors in the graph.

5. The computer-implemented method of claim 4, wherein the action is updating a node in the graph and performing the action comprises:
   obtaining a lock for the entry for the vector in the node data structure;
   updating the node associated with the vector in the graph;
   recalculating edge values for nodes impacted by the updating of the node; and
   releasing a lock for the entry for the vector in the node data structure.

6. The computer-implemented method of claim 4, wherein the request to perform an action on a node associated with a vector in a graph includes an identifier of the vector and a collection including the vector.

7. The computer-implemented method of claim 4, wherein the action is adding a node in the graph and performing the action comprises:

determining there is not an entry for the vector in the node data structure;
adding the node associated with the vector to the graph;
recalculating edge values for nodes impacted by the adding of the node; and
adding an entry for the vector into the node data structure.

8. The computer-implemented method of claim 7, wherein the request to add a node associated with a vector in a graph includes an identifier of the vector and a collection including the vector.

9. The computer-implemented method of claim 4, wherein the action is to get a node in the graph and performing the action comprises:
obtaining a read lock associated with the node in the node data structure;
reading the node from the graph; and
releasing the read lock associated with the node in the node data structure.

10. The computer-implemented method of claim 9, wherein the request to get a node associated with a vector in a graph includes an identifier of the vector.

11. The computer-implemented method of claim 4, wherein the action is deleting a node in the graph and performing the action comprises:
determining there are no locks associated with an entry for the node in the node data structure;
deleting the node from the graph;
recalculating edge values for nodes impacted by the deleting of the node; and
updating the entry for the node in the node data structure to have a null pointer for the node.

12. The computer-implemented method of claim 11, wherein the request to delete a node associated with a vector in a graph includes an identifier of the vector.

13. The computer-implemented method of claim 4, wherein the node data structure is a table.

14. The computer-implemented method of claim 4, wherein the action includes performing Dijkstra's algorithm to update edges of the graph impacted by the action.

15. An apparatus, comprising:
a processor; and
a non-transitory machine-readable storage medium storing instructions which, when executed by the processor, causes the apparatus to:
receive a request to perform an action on a node associated with a vector in a graph;
utilize a node data structure to determine that the action is allowed, the node data structure including a plurality of entries and each entry corresponds to a node in the graph and includes an indication of a read or write lock usage, a vector identifier, and a pointer to the node in the graph;
perform the action; and
during performance of the action, allow queries associated with one or more vectors in the graph.

16. The apparatus of claim 15, wherein the action is to update a node in the graph, and wherein the apparatus, to perform the action, is caused to:
obtain a lock for the entry for the vector in the node data structure;
update the node associated with the vector in the graph;
recalculate edge values for nodes impacted by the updating of the node; and
release a lock for the entry for the vector in the node data structure.

17. The apparatus of claim 16, wherein the request to update a node associated with a vector in a graph includes an identifier of the vector and a collection including the vector.

18. The apparatus of claim 15, wherein the action is to add a node in the graph, and wherein the apparatus, to perform the action, is caused to:
determine there is not an entry for the vector in the node data structure;
add the node associated with the vector to the graph;
recalculate edge values for nodes impacted by the adding of the node; and
add an entry for the vector into the node data structure.

19. The apparatus of claim 18, wherein the request to add a node associated with a vector in a graph includes an identifier of the vector and a collection including the vector.

20. The apparatus of claim 15, wherein the action is to get a node in the graph, and wherein the apparatus, to perform the action, is caused to:
obtain a read lock associated with the node in the node data structure;
read the node from the graph; and
release the read lock associated with the node in the node data structure.

* * * * *